US000001488H

United States Statutory Invention Registration [19]

[11] Reg. Number: H1488

[43] Published: Sep. 5, 1995

Campagnuolo et al.

[54] ANTI-FRATRICIDE APPARATUS AND METHOD

[75] Inventors: Carl J. Campagnuolo, Potomac; Stephen Kreider, Laurel, both of Md.

[73] Assignee: The United States of America as represented by the Secretary of the Army, Washington, D.C.

[21] Appl. No.: 156,745

[22] Filed: Nov. 23, 1993

[51] Int. Cl.[6] ..... G01S 13/78

[52] U.S. Cl. ..... 342/45; 342/42; 342/44

[58] Field of Search ..... 340/825.3, 825.34, 825.49; 342/40, 45; 968/DIG. 1; 235/380; 359/107

[56] References Cited

U.S. PATENT DOCUMENTS

| | | | |
|---|---|---|---|
| 3,922,673 | 11/1975 | Bishop | 342/45 |
| 3,989,942 | 11/1976 | Waddoups | 359/170 |
| 5,105,179 | 4/1992 | Smith . | |
| 5,299,227 | 3/1994 | Rose | 340/825.34 |

OTHER PUBLICATIONS

Reed; INSPEC4353627; "A personal level identification friend or foe system"; Jun. 1992; IEEE.

"Announcing the most significant illumination breakthrough in decades", Loctite Luminescent Systems Inc. (1990).

"You can do more with our EL lamps than any other light", Loctite Luminescent Systems Inc. (1989).

"LCD EL Backlight Data Sheet, Revision 0892", Loctite Luminescent Systems Inc. (1992).

*Primary Examiner*—Bernarr E. Gregory

*Attorney, Agent, or Firm*—Freda L. Krosnick; Frank J. Dynda; Muzio B. Roberto

[57] ABSTRACT

A method of and an apparatus for positively identifying the vehicles, troops, and landmarks of friendly forces to reduce or eliminate the threat of fratricide includes a light display comprising a plurality of flexible electroluminescent panels which are conformable with and affixable to visible outer surface of friendly or noncombatant vehicles, troop helmets, or landmarks. Each of the panels is electrically energized and modulated under computer control to provide various combinations of pattern display, color, intensity, and activation times to transmit a desired identification code.

18 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ANTI-FRATRICIDE APPARATUS AND METHOD

FIELD OF THE INVENTION

The present invention relates to a method of and an apparatus for providing coded, positive identification of "friendly" and neutral vehicles, troops, and landmarks to reduce or eliminate the danger of fratricide, (i.e., casualties of friendly troops or noncombatants resulting from incomplete identification or misidentification by friendly troops within a theater of combat) and for rapidly and effectively recoding that identification to prevent emulation and subterfuge by unfriendly combatants.

DESCRIPTION OF THE PRIOR ART

Positive identification of friendly vehicles, troops, and landmarks is necessary for preventing fratricide in surface-to-surface, surface-to-air, air-to-surface, and air-to-air encounters of a hostile nature during which time the positioning of those vehicles and troops may be confused with the vehicles and troops of the hostile forces. For example, fixed indicia of identification has included painted or laminated forms of the inverted V applied to wheeled and tracked vehicles and troop helmets as used by the Allied forces during the Persian Gulf War of 1991. This type of fixed code is applied directly and permanently to one or more surfaces of the friendly vehicles and helmets. One problem with this type of identification is that the identifying mark is readily visible from only a relatively short distance, and only when illuminated by an external light source. Another problem with this approach is that the mark is fixed in the installed condition, and is therefore readily emulated by unfriendly combatants for purposes of subterfuge and deceptive combat tactics.

Another type of known identification for avoiding fratricide is point sources of illumination collectively known as "BUD" lights or "DARPA" lights. Although this type of identification is obviously self-illuminating, because it is a point source it is likewise visible from only relatively short distances. Accordingly, such devices cannot provide the longer range of visibility necessary for purposes of consistent, positive identification. Furthermore, the individual point sources of illumination of this type of identification are also relatively fixed in terms of identification coding.

Thermal tapes have also been used for vehicle and troop identification, but are generally regarded as offering less than optimal identification capabilities.

SUMMARY OF THE INVENTION

It is therefore an object of the present invention to provide an apparatus for positively identifying the vehicles, troops, and landmarks of friendly forces to reduce or eliminate fratricide.

It is another object of the present invention to provide a selectively codable identifying apparatus for positively identifying the vehicles, troops, and landmarks of friendly forces.

Another object of the present invention is to provide an identifying apparatus for positively identifying the vehicles, troops, and landmarks of friendly forces, the coding projected from said apparatus being readily visible from relatively long distances in either the visible region or the infrared region of the electromagnetic wavelength spectrum.

It is a further object of the present invention to provide a programmable method of positively identifying the vehicles, troops, and landmarks of friendly forces.

The present invention is a method of and an apparatus for positively identifying the vehicles, troops, and landmarks of friendly forces to reduce or eliminate the threat of fratricide. This invention includes a light display comprising a plurality of flexible electroluminescent panels having a color formulated phosphor layer, i.e. electroluminescent panels, which are conformable with and affixable to a visible outer surface or surfaces of the friendly or noncombatant vehicles, troop helmets, or landmarks. Each of the electroluminescent panels is electrically activated and modulated under computer control to provide various combinations of pattern display, color, intensity, and activation times to transmit a desired code or message. One type of electroluminescent panel is operable in a number of colors within the visible spectrum of illumination. Other types of panels are operable in the infrared spectrum, and are therefore detectable only by infrared detectors, such as with night vision devices. Unlike point-source type displays, the electroluminescent panels of the present invention may have a large surface area and therefore are not distance-limited to the same extent.

More particularly, the electroluminescent panels can be shaped and patterned to conform to surface contours, and in the installed condition under computer control, to provide a variety of identifying signatures specific to a particular vehicle, troop platoon, or landmark. When operated by computer control, such coding provides an effective countermeasure to enemy emulation and subterfuge and other deceptive tactics, while also providing means for identifying in more precise terms the specific type and piece of equipment or troop count and position.

The electroluminescent panels may be selectively placed on a vehicle to allow identification from a specific direction, so as to be readable, e.g., by airborne aircraft for air-to-surface identification. In terms of land-based tracked and wheeled vehicles, the panels are selectively placed to the sides or back portions thereof for surface-to-surface identification, as well as on top portions thereof for air-to-surface identification. Another application is to landmarks, such as buildings or landing strips, also oriented in a directionally-specific manner to be visible only to oncoming friendly forces approaching from land, sea, or air.

With the foregoing and other objects, advantages and features of the invention that will become hereinafter apparent, the nature of the invention may be more clearly understood by reference to the following detailed description of the invention, the appended claims, and to the several views illustrated in the drawings.

DETAILED DESCRPTION OF THE INVENTION

Figure 1:
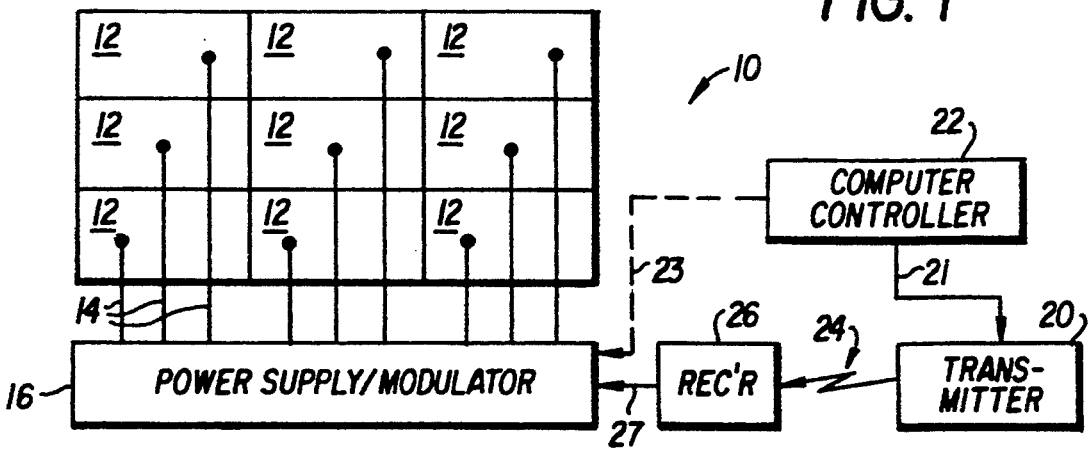
FIG. 1 is a diagrammatic, elevational view of a display panel showing a grid of a plurality of electroluminescent light panels interactively radio-linked to a computer controller.

Referring now in detail to the drawings wherein like parts are designated by like reference numerals throughout, there is illustrated in FIG. 1 a display panel 10 comprising a plurality of electroluminescent panels 12 arrayed in a matrix. The electroluminescent panels 12 are generally constructed of a sandwich of color formulated phosphor deposited between sheets of aluminum foil and transparent electrodes with copolymer laminate included as an insulation and moisture barrier. Suitable panels 12 being operable within the visible spectrum are manufactured by Loctite Luminescent Systems, Inc., Lebanon, N.H. In one form, the electroluminescent panels 12 are each about ten (10) inches square with a thickness of about 0.040 inch. Each panel 12 preferably provides a uniform surface luminescence having a lighting brightness of at least 50 fl (ft-lambert).

Each panel 12 is either voltage controlled or frequency controlled. A voltage controlled panel 12 provides a single color illumination for a particular voltage. Alternatively, a frequency controlled panel 12 provides a range of color illumination, e.g., from green to blue, with a particular range of frequencies generated by a power source/modulator, as will be further described. It is also contemplated that the electroluminescent panels 12 are operable in the near infrared region (0.8 microns) and infrared region (1.5 microns), these regions being detectable with infrared detectors, such as night vision devices. Each electroluminescent panel 12 is either frequency controlled or voltage controlled by a power supply/modulator 16 responsive to output signals from a computer controller 22. The power supply/modulator 16 is electrically connected by an electrical conductor 14 to each of the electroluminescent panels 12 in the grid 10. The output signals from the computer controller 22 are carried by a first electrical conductor 21 to a transmitter 20 which then transmits the signals over a radio link 24 to a signal receiver 26. The signals are then carried by a second electrical conductor 27 from the signal receiver 26 to the power supply/modulator 16. The power supply/modulator 16 includes a logic circuit for simultaneously modulating each of the panels 12. The computer controller 22 is programmable to provide the modulation parameters for each display grid 10 under its control as necessary to provide a particular coded identification.

Figure 2:
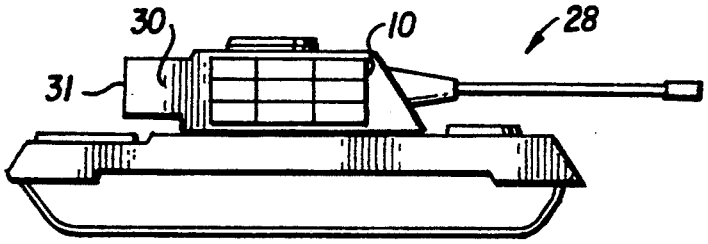
FIG. 2 is a side elevational view of a tracked military vehicle showing a grid of electroluminescent light panels affixed to a turret side thereof.

The relative thinness and flexibility of the electroluminescent panels 12 enables their manipulation and formation into various shapes and patterns. Referring to FIG. 2, a tracked military vehicle such as a tank 28 or other tracked or wheeled vehicle, such as a personnel carrier or the like, includes a display panel 10 affixed to a vertical surface 30 of a turret 31 of tank 28. The display panel 10 may alternatively or additionally be affixed to horizontal surfaces of the vehicle 28 for identification by above-ground observers. The display panel 10 is shaped and configured to complement the surface contours of the outer vehicle surfaces to which it is to be affixed. This is readily accomplished due to the relatively flexible nature of the display panel 10, which is then electrically connected to radio signal receiving apparatus mounted to or within the vehicle for receipt of a control and modulation signal received from a remote source or from within the vehicle 28 itself. Remote modulation is achieved through a radio link or a microwave link, optionally transmitted over long distances by satellite. As will be appreciated by the skilled artisan, remote programming and activation enables spontaneous and simultaneous control on demand over, for example, the identification coding of an entire platoon or squadron.

In the instance of a self-contained system within, e.g., a vehicle 28, the computer controller 22 outputs modulator signals through a hardwired link shown by phantom line 23 (FIG. 1) directly to the power supply/modulator 16, thereby bypassing the transmitter 20 and radio receiver 26.

Figure 3:
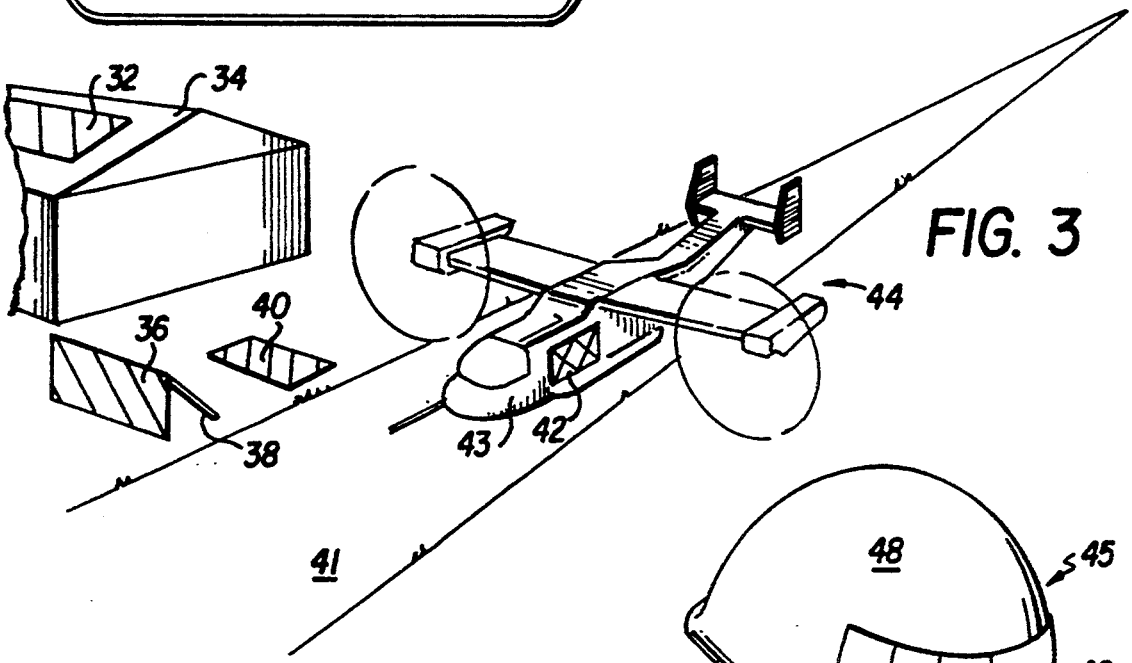
FIG. 3 is a perspective, partial view of an airstrip facility showing a first light panel grid affixed to a building roof, a second light panel grid secured in a vertical position for near-land and on-land viewing, a third grid secured in a horizontal position for air viewing, and a fourth grid mounted to the side of an aircraft fuselage.

Now referring to FIG. 3, a display panel 32 of the type described above is affixed to a building 34, and in one exemplary embodiment, to the roof of the building 34 for observation by above-ground observers. Display panels 32 of this embodiment are generally not limited by contour and location restrictions and thus may be enlarged as desired to effect enhanced identification from greater distances. Another display panel 36 offering all of the control and modulation characteristics described above is mountable to a ground level position by a support structure 38 for near-land and on-land observation and identification, such as for aircraft positioning and provisioning in a dark location. In like manner, another display panel 40 is secured in a horizontal position adjacent a landing strip 41 for air viewing as necessary to provide identification and/or direction markers to overflying aircraft.

Another embodiment intended for vehicular application also shown in FIG. 3 is the display panel 42 secured to the fuselage 44 or other structure of an aircraft 44 shown positioned on the landing strip 41. It is envisioned that such display panel 42 may also be mounted to the underside of the fuselage 44 or control surfaces of the aircraft for observation and identification by ground-based observers or friendly aircraft, and to the top side of the fuselage and control surfaces also for observation and identification from above by friendly aircraft. As with the application of the display panel 10 affixed to the land-based vehicles previously described, the display panel 42 of this embodiment may be controlled from within the aircraft or by radio link from a remote source by the system shown in FIG. 1.

Figure 4:
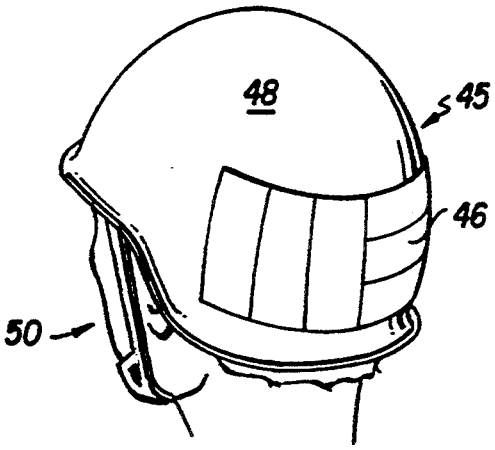
FIG. 4 is a perspective view of a troop helmet showing a grid of electroluminescent light panels affixed to a back and side portion thereof.

Now referring to FIG. 4, a display panel 45 comprised of a grid of electroluminescent panels 46 is affixed to a back and side portions of a helmet 48 worn by a friendly soldier 50. The display panel 45 of this embodiment is controlled and modulated by a power supply/modulator and microcomputer affixed to the helmet or by a link as described above in connection with FIG. 1. It is contemplated that a self-destruct device may be provided for the system to prevent deceptive emulation by enemy combatants in the event of capture of the soldier 50.

The grids of panels 10, 32, 36, 40, and 45 are comprised of a plurality of light panels which are positioned in a particular configuration for identifying a particular application, such as a tank, wheeled vehicle, aircraft, building or land structure, or personnel. According to a first example, the electroluminescent panels 12 of the grid 10 are arrayed in a window pane configuration to identify a tracked or wheeled vehicle, as shown in FIG. 2. According to a second example, the electroluminescent panels 32, 36, and 40 are arrayed in diagonal strips to identify a building structure and a land-based structure (such as an airport runway), as shown in FIG. 3. According to a third example, the electroluminescent panels 45 are arrayed in a cross-hatched configuration to identify an aircraft, also shown in FIG. 3. According to a fourth example, the electroluminescent panels 46 are arrayed in horizontal and vertical strips on a soldier's helmet or other apparel (not shown) for identification as friendly personnel, as shown in FIG. 4.

It has been determined in one experiment that the panels of the larger applications, such as a display panel 10 having a display area of about four square feet may be observed and identified from a distance of 2–3 miles. In like manner, it has been determined that a display panel 45 affixed to a soldier's helmet 48 can be observed and identified from a distance of about 150 feet to about 250 feet. It will be appreciated by the skilled artisan that such viewing distances will be based on the actual size of the applicable display panel and each electroluminescent panel thereof, modulation and oscillation characteristics and modes of the display panel, angle of display, and environmental and field conditions. Furthermore, it is contemplated that electroluminescent panels radiating in the near infrared or within the infrared wavelength spectrum will be identifiable to the extent provided by the power of those night vision devices used for identification purposes.

Each grid of panels 10, 32, 36, 40, and 45 is operated by the method of determining the particular field requirement of each panel and then providing a coding signal or sequence of signals which is readily identifiable to friendly combatants. For example, specific electroluminescent panels 12, 46 in display panels 10, 45, respectively, are alternately or sequentially modulated or flashed in a predetermined code, or specific colors in each display panel are illuminated for predetermined intervals of time as necessary to completely and effectively identify the application. Frequent code changes are contemplated to deter or prevent emulation by enemy combatants. Such coding is accomplished by inputting the desired signal or sequence of signals to the computer controller 22 (FIG. 1) which then broadcasts a selected signal through a radio link 18 (or alternatively, through hardwired link 23) to the power supply/modulator 16 operatively connected to each panel grid.

Although certain presently preferred embodiments of the invention have been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and the applicable rules of law.

We claim:

1. Anti-fratricide apparatus comprising:

a unit to be identified, an electroluminescent panel affixed to said unit, and means electrically connected to said panel for illuminating the panel.

2. The anti-fratricide apparatus of claim 1, further comprising a plurality of electroluminescent panels arrayed in a predetermined configuration, and controller means for illuminating selected ones of the panels.

3. The anti-fratricide apparatus of claim 1, wherein the unit to be identified is a vehicle.

4. The anti-fratricide apparatus of claim 1, wherein the unit to be identified is a land-based structure.

5. The anti-fratricide apparatus of claim 1, wherein the unit to be identified is personnel.

6. The anti-fratricide apparatus of claim 5, wherein said unit includes a helmet, said panel being affixed to the exterior of said helmet and said illuminating means being mounted to said helmet.

7. The anti-fratricide apparatus of claim 6, including a plurality of said panels affixed to said helmet in a predetermined pattern, and including control means operatively connected to said power supply/modulator for illuminating selected ones of said panels according to a predetermined code.

8. The anti-fratricide apparatus of claim 1, wherein the electroluminescent panel illuminates in the visible region of the electromagnetic spectrum.

9. The anti-fratricide apparatus of claim 1, wherein the electroluminescent panel illuminates in the infrared region of the electromagnetic spectrum.

10. The anti-fratricide apparatus of claim 1, further comprising control means for remotely programming and operating the electroluminescent panel.

11. The anti-fratricide apparatus of claim 10, wherein said control means includes a coding signal source operatively connected to said illuminating means, said illuminating means comprising a power supply/modulator electrically connected to the electroluminescent panel.

12. The anti-fratricide apparatus of claim 11, wherein said coding signal source is a computer controller.

13. The anti-fratricide apparatus of claim 11, wherein the coding signal source is connected to the power supply/modulator through a radio transmitter and receiver.

14. The anti-fratricide apparatus of claim 1, wherein said electroluminescent panel is frequency controlled.

15. The anti-fratricide apparatus of claim 1, wherein said illuminating means comprises a power supply/-modulator electrically connected to said panel.

16. An anti-fratricide method, comprising the steps of:

applying at least one electroluminscent panel to a unit to be identified; and electrically energizing the electroluminescent panel to identify the unit.

17. The anti-fratricide method of claim 16, comprising the steps of:

applying a plurality of electroluminescent panels to the unit to be identified, and electrically energizing selected ones of the panels in a predetermined coded pattern to identify the unit.

18. The anti-fratricide method of claim 17, including the step of varying the coded pattern.

* * * * *